June 6, 1944.  W. LEATHERS  2,350,405
AUTOMATIC METER READING APPARATUS
Original Filed Aug. 2, 1940
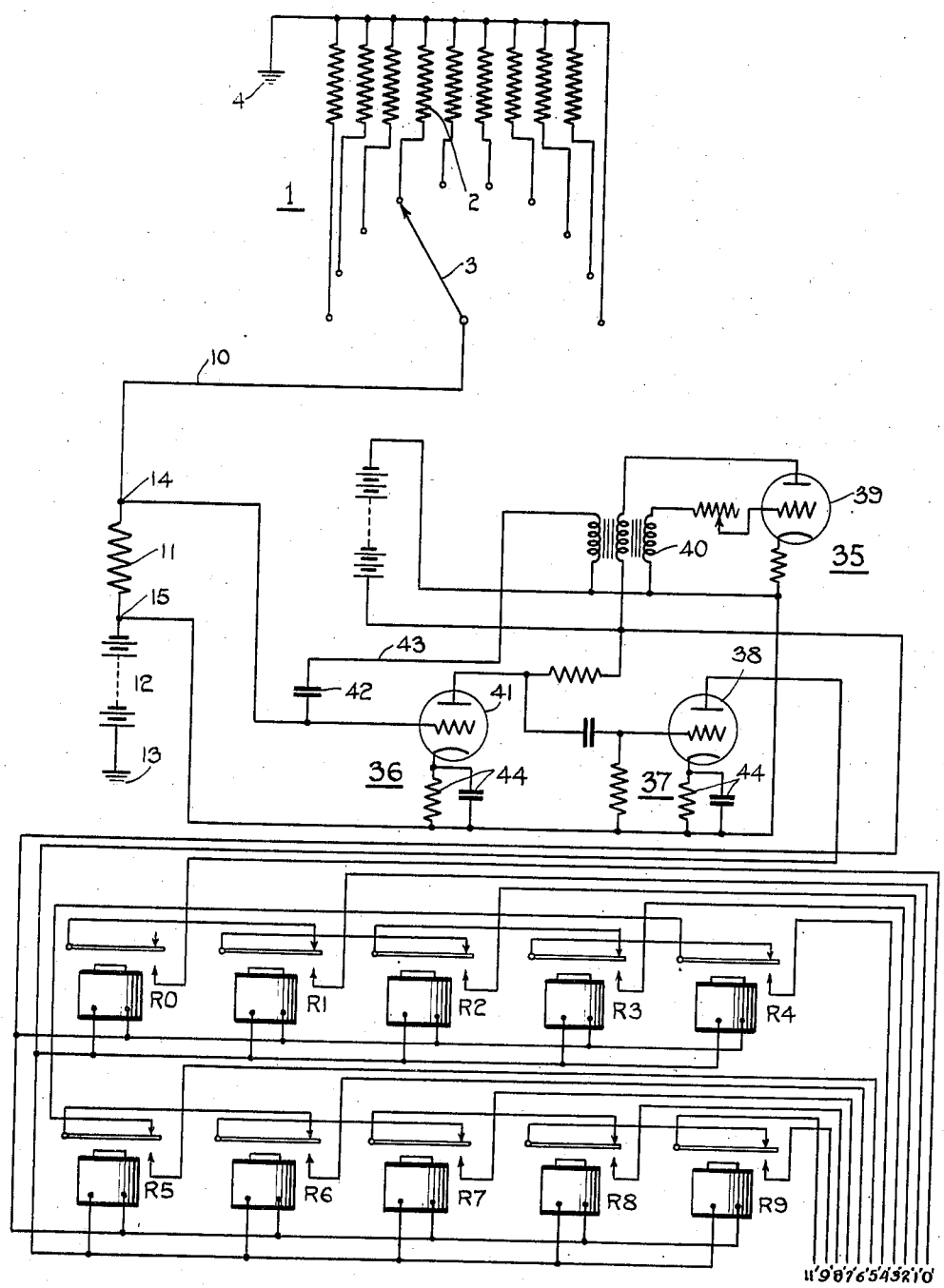
INVENTOR.
W. Leathers Patented June 6, 1944

2,350,405

UNITED STATES PATENT OFFICE 2,350,405

AUTOMATIC METER READING APPARATUS

Ward Leathers, Brooklyn, N. Y., assignor to International Business Machines Corporation, New York, N. Y., a corporation of New York Original application August 2, 1940, Serial No. 349,981. Divided and this application April 18, 1942, Serial No. 439,540

1 Claim. (Cl. 250—27)

The improved electronic selecting system comprising the present invention is primarily adapted for use in connection with telemetric apparatus wherein distant readings or recordings of a register indication may be effected. The invention, however, is susceptible to modification and the system may be employed in the electronic transmission of readings of meteorological and other scientific instruments, or, still more broadly, in the transmission of readings which indicate the relative position of a movable member such as a float in a level indicating system or a pointer, vane or the like in a direction indicating system. Irrespective, however, of the particular use to which the invention may be put, the essential features thereof remain substantially unaltered in principle.

In my prior Patent No. 2,295,534, dated September 15, 1942, for an Automatic meter-reading apparatus, there has been disclosed a method of making a positive selection of reading circuits over a single channel employing a voltage drop therein. In this patent various means for sharply discriminating between signal impulses, which differ from each other by a narrow margin of electrical magnitude, have been disclosed. The present application is a division of the copending application from which the above referred-to patent issued and relates to electronic discrimination between such signal impulses by the expedient of utilizing the voltage drop that occurs in the signal channel to vary the gain in an amplifying circuit and, in turn, vary or modulate the amplitude of constant frequency audio oscillations produced in a local oscillator circuit, and thereafter utilizing the modulated oscillations to operate a series of marginally biased relays or response elements which are employed for the purpose of selectively closing a series of work circuits by means of which suitable apparatus is caused to register or record the indications at a receiving point or station. Such an arrangement possesses the decided advantage that oscillations are quite readily amplified by a relatively simple electronic circuit which is stable within the required limits of amplification and which may be constructed with a minimum amount of equipment thus reducing the cost of the apparatus required to a minimum.

The provision of an apparatus of the character set forth above being the principal object of the present invention, other objects and advantages of the invention will become readily apparent as the nature of the invention is better understood.

In the accompanying drawing forming part of this specification, the figure is a diagrammatic view showing a preferred embodiment of the improved selecting system comprising the present invention.

Referring now to the drawing in detail, a series of resistances 2 having a common connection grounded as at 4 are adapted to be selectively connected by means of a movable member or switch arm 3 in an impedance signaling circuit including a line 10 leading from the resistances to a central station 5 located at a distance from the latter. The movable member 3 may be in the form of a manual selector in a signaling system or it may be moved and its position changed in accordance with the movement of another movable member such as a meter pointer or dial, a cyclometer wheel in a meter construction, a float in a liquid level indicating system or, in fact, any movable member the position of which it is desired to determine at the central station 4.

Each of the resistors 2 is of a definite ohmic value and the values of the various resistors are correlated with the different positions capable of being assumed by the movable member or switch arm 3. Where the member 3 represents a meter pointer or cyclometer wheel, for example, the ohmic values of the various resistors 2 may be progressively increasing in one direction or the other so that as each resistor is separately and individually connected into the reading channel, the overall ohmic resistance or impedance value of the channel will be altered in definite steps capable of ready discrimination according to the principles of the present invention. Thus, Arabic numerals or other arbitrary values may be indicated or recorded at the central station which are indicative of the positions capable of being assumed by the movable member 3.

A resistance 11 having terminals 14 and 15 and a battery 12 or other source of constant voltage supply are connected in series in the reading circuit or channel at the central station 5, the arrangement being such that varying potential differentials will occur across the terminals 14 and 15 of the resistor 11 as the various resistances 2 are successively or otherwise connected in the circuit in series with the resistance 11. In each instance the fraction of the voltage supplied by the battery that will exist across the terminals 14 and 15 is the ratio of the ohmic value of the resistor 11 to the ohmic value of this resistor when added to the ohmic value of the particular resistance 2 which may be connected in the circuit. Substitution of the various resistances 2 in the circuit will thus alter the ratio or fraction of the battery voltage existing across the terminals of the resistor 11 and it is these varying voltage differentials which, according to the present invention, are discriminated one from another as will become readily apparent presently.

A plurality of work circuits are designated by reference characters ranging successively from 0' to 9' inclusive, with a common terminal circuit wire 11' for all of the circuits. These circuits correspond in number to the number of resistances 2 and, upon closing of any one circuit, an indicating or recording function is adapted to be performed at the central station to indicate or record a numeral or other arbitrary value assigned to a particular position assumed by the movable member 3.

The various circuits 0' to 9' are potentially arranged in parallel; that is to say, they are capable of being separately and individually connected, through one or more of a multiple series of relay-actuated two-way switches S0 to S9 inclusive, to the common terminal wire 11' in order that a single individual recording or indicating operation may be effected. Each switch is controlled by a respective solenoid or relay of a series designated at R0, R1, R2, etc., and the switches are so designed, and the relays therefor marginally controlled, that upon actuation of each switch by its respective relay, a corresponding circuit is closed while at the same time the circuits in the series preceding the one which is closed become opened. Such an arrangement of circuits and relay controlled switches has been fully illustrated and described in my patent above referred to and reference may be had thereto for a full understanding of the manner in which the various switches operate to individually and separately close their corresponding reading circuits.

The windings of the relays or solenoids R0, R1, R2, etc., are connected in parallel relationship in the output circuit line $a$ of an electronic alternating current power amplifier tube 38 which is biased as at 44 by a resistor-condenser combination and the various relays are marginally set by either mechanical means or electrical means for successive operation upon application to the circuit of output current of increasing amplitude. The amount of power, i. e. the amplitude of the output current delivered by the amplifying tube 38 through the line $a$ is a factor of the input current, the tube being designed to operate over a linear portion of the $E_g$—$I_p$ curve for the tube. The input current for the tube 38 is derived from the plate circuit line $b$ of an oscillator tube 39 having a feed-back to its grid circuit through a line $c$ and a transformer 40. The oscillations produced by the tube 39 are fed through a line 43 and blocking condenser 42 to the grid of an initial amplifying tube 41 which is biased to a value determined by the tube characteristics by means of a resistor-condenser combination 44. The resistor 11 is placed across the grid-cathode path $d$, $e$ of the tube 41 in such a manner as to modify the normal tube bias. Thus it will be seen that the varying voltage drop developed across the resistor 11 will serve to modulate the amplitude of the oscillations fed to the input of this tube through the line 43 and condenser 42 and that these variations in amplitude are greatly magnified by the amplifier tube 38 whence they appear in the common relay circuit and pass through the windings of the various solenoids R0, R1, R2, etc., at high power levels. The relays are thus caused to operate marginally in the manner previously described to selectively close the various circuits 0', 1', 2', etc., to render the desired numerical or other indication of the position of the movable member 3.

The invention is not to be limited to the exact arrangement of parts shown in the accompanying drawing or described in this specification as various changes in the details of construction may be resorted to without departing from the spirit of the invention. For example, while ten resistors have been employed for varying the impedance of the signaling circuit in accordance with the ten positions capable of being assumed by a meter indicator, which is to be read in terms of Arabic numerals, it is obvious that a greater or lesser number of resistors may be employed if desired. Furthermore, it is within the scope of the present invention to employ an electronic circuit arrangement somewhat different from that shown inasmuch as other circuit arrangements are capable of producing audio oscillations and modifying them in accordance with the voltage drop across a resistor or its equivalent. Only insofar as the invention has particularly been pointed out in the accompanying claim is the same to be limited.

What is claimed is:

In an apparatus for translating voltages of slightly different magnitudes and representative of digits into voltages of relatively widely different magnitudes, a receiving and transmitting electronic circuit including an amplifier tube having an input circuit and an output circuit, means for selectively applying said slightly different voltages to said input circuit, an oscillator tube for generating alternating current of a definite frequency and having an input and an output circuit, means operatively connecting the input circuit of said amplifier tube to the output circuit of said oscillator tube to control the constant frequency oscillations produced by the latter in accordance with said applied voltages, an alternating current power amplifier having an input circuit and an output circuit, means operatively connecting the output circuit of the first amplifier tube to the input circuit of said power amplifier tube whereby marginal voltages of widely different amplitudes will be transmitted in the output circuit of said power amplifier tube.

WARD LEATHERS.